United States Patent Office 3,324,052
Patented June 6, 1967

3,324,052
PRODUCTION OF SUSPENSION POLYMERS
Ludwig Zuern, Mannheim, and Heinz Mueller-Tamm and Karl Buchholz, Ludwigshafen (Rhine), Germany, assignors to Badische Anilin- & Soda-Fabrik Aktiengesellschaft, Ludwigshafen (Rhine), Germany
No Drawing. Filed June 4, 1963, Ser. No. 285,211
Claims priority, application Germany, June 6, 1962, B 67,574
10 Claims. (Cl. 260—2.5)

This invention relates to the production of styrene polymers. More specifically, the invention relates to a new process for the production of styrene polymers by suspension polymerization.

Homopolymers and copolymers of styrene are often prepared by polymerization of the monomers in aqueous suspension. Polymers are then obtained in the form of beads having a diameter between a few tenths of a millimeter to a few millimeters. This method has achieved technical importance particularly for the production of expandable styrene polymers. In this variant of the method, the monomers are polymerized in the presence of liquid or gaseous expanding agents.

It has been found that the shape and nature of the beads obtained by suspension polymerization are of considerable importance for the processing of the beads. The particles usually exhibit more or less pronounced pockmarks or contain enclosed gas bubbles which usually lie beneath the surface. Particles of this description do run freely and can only be dried slowly. During the expansion of the expandable styrene polymers, the enclosed gas expands so that molded articles prepared therefrom contain cavities and irregular depressions on the surface.

It is an object of the present invention to provide a process for the manufacture of styrene polymers by suspension polymerization, the products of which do not have the said disadvantages. Another object of the present invention is to produce finely particled expandable styrene polymers.

These objects are achieved in the polymerization of styrene or mixtures of styrene and other monomeric polymerizable compounds in aqueous suspension using polymerization catalysts and suspension stabilizers at elevated temperature, when the pressure in the polymerization vessel is raised, by forcing in insert gases, by at least one fifth of the original pressure when the conversion reaches a stage at which the polymer particles no longer coalesce.

Beads which do not contain any enclosed gas and whose surface is smooth are obtained by the process according to this invention. The process is therefore particularly suitable for the production of expanded styrene polymers because the beads obtained can be expanded to form shaped articles which exhibit a smooth surface and are free from blisters. Molded articles prepared from the styrene polymers obtained by the process according to this invention therefore have better insulating properties and a better appearance than those which have been prepared from styrene polymers obtained by prior methods.

Apart from forcing in inert gas, the process is carried out in the conventional way. Suspension polymerization methods are described for example in the book, "Methoden der organischen Chemie" (Houben-Weyl), volume XIV/1, "Makromolekulare Stoffe," part 1, Georg Thieme Verlag, Stuttgart, 1961, pages 407 to 433 and 839 to 841, and also in "Styrene, its polymers, copolymers and derivatives." by R. H. Boundy, R. F. Boyer, Reinhold Publishing Corporation, New York, 1952.

Styrene may be polymerized alone or in admixture with other ethylenically unsaturated monomeric compounds which are miscible and copolymerizable with styrene. The mixtures contain at least 50% by weight of styrene and up to 50% by weight of other ethylenically unsaturated monomeric polymerizable compounds, preferably 70 to 95% by weight of styrene and 30 to 5% by weight of other ethylenically unsaturated monomeric polymerizable compounds. Suitable comonomers are for example monovinylaromatic compounds which may be substituted in the nucleus or at the carbon atoms in the vinyl group, such as nuclear halostyrenes, nuclear methylstyrenes, $\alpha$-methylstyrene, nitriles of $\alpha,\beta$-unsaturated carboxylic acids, such as acrylonitrile and methacrylonitrile, esters of $\alpha,\beta$-unsaturated carboxylic acids with alcohols having one to twenty carbon atoms, such as acrylic or methacrylic esters, particularly esters of alcohols having one to eight carbon atoms and vinylcarbazole. From 0.001 to 0.5% of divinyl compounds, such as divinylbenzene, may also be present in the monomer mixtures.

To prepare expandable styrene polymers, the polymerization is carried out in the presence of expanding agents. The expanding agent is advantageously mixed with the monomer or monomers prior to the commencement of the polymerization. Expanding agents which are known to be suitable are organic liquids and gases liquefiable under pressure which do not dissolve or only swell the polymer and whose boiling points are below the softening point of the polymer (determined by the method of Vicot, see German Industrial Standard DIN–57 302), for example aliphatic hydrocarbons, such as propane, butane, pentane and hexane, or cyclic hydrocarbons, such as cyclopentane and cyclohexane. Halohydrocarbons, such as dichlorodifluoromethane and 1,2,2-trifluoro-1,1,2-trichloroethane, may also be used. Solvents for the thermoplastic styrene polymers may also be used in admixture with hydrocarbons or halohydrocarbons. One of the components of the mixture should have a boiling point which is below the softening point of the styrene polymer. Alcohols, such as methanol and ethanol, are also suitable as expanding agents in admixture with hydrocarbons and/or halohydrocarbons. The expanding agents are adavntageously used in amounts of 3 to 15% by weight with reference to the monomers or monomer mixtures.

Polymerization of the monomers may be carried out in the presence of a great variety of additives, for example dyes, plasticisers or halogen compounds serving as flame retardants, such as chloroparaffins or brominated butadiene oligomers. The additives may be added to the monomers or introduced together with the expanding agent.

It is convenient to carry out the process at a temperature between 50° and 120° C., advantageously between 60° and 90° C., using the amounts of water conventionally used in suspension polymerizations. The usual catalysts which decompose into free radicals are used. Examples of these catalysts are organic peroxides, peresters or hydroperoxides, such as benzoyl peroxide, ditertiary-butyl peroxide, lauryl peroxide, tertiary-butyl perbenzoate or azo compounds, such as azodiisobutyronitrile or azo-($\alpha$-cyano)-valeric acid. It is also sometimes advantageous to use mixtures of these compounds. It is advantageous to use the catalysts in amounts of 0.1 to 1%, preferably 0.2 to 0.5%, by weight with reference to the monomer or monomers.

Particularly suitable suspension stabilizers are high molecular weight water-soluble compounds, such as acrylamide, methacrylamide or vinylpyrrolidone polymers, polyvinyl alcohol or water-soluble cellulose derivatives, such as hydroxyethylcellulose or carboxymethylcellulose. Inorganic suspension stabilizers, such as barium sulfate or calcium phosphate, may also be used. Copolymers of N-vinylpyrrolidone and acrylic esters or vinyl esters in which the alcohol or carboxylic acid components contain one to eight carbon atoms are particularly suitable.

In the suspension polymerization process it is known that the particles, which contain monomer and polymer, coalesce from the beginning of the polymerization until a certain conversion has been achieved, i.e. particles formed may unite to form larger particles and larger particles may separate into smaller particles. Beyond the said point in the conversion, this process no longer takes place. This point in the conversion is usually known as the "particle identity point." It is dependent on the composition of the monomers, on the presence of additives, such as plasticizers, expanding agents or flame retardants, and on the polymerization conditions. It may be determined experimentally, for example according to methods such as described in the "Journal of Applied Polymer Science," volume 3, 1960, page 374.

In the case of the polymerization of styrene, the conversion is at about 40 to 95% depending on the molecular weight of the polymer obtained and on the viscosity and on any plasticizing additives present.

The pressure in the reactor is raised by at least one-fifth of the original pressure by forcing in inert gas when the stage of the conversion is reached at which the polymer particles no longer coalesce, i.e., around the "particle identity point."

It is necessary that the inert gas should be forced in at about the point at which the said definite conversion has been achieved. If the gas is forced in appreciably before or after this time, i.e. at a substantially lower or higher conversion, the advantage of the process according to this invention is not obtained. If the pressure in the reactor is increased by less than one-fifth of the original pressure, the advantage of the process is only partly realized. After the suspended polymer particles have passed through the plastic phase, the pressure may be lowered again. The pressure in the reactor may be raised to any desired extent; there is no critical upper limit. In practice the pressure can be increased only to the limit determined by the pressure which the polymerization vessel used is capable of withstanding. The pressure to be set up in the reactor at the beginning of the polymerization is usually between 1 and 3 atm. abs. and in the production of expandable bead polymers between 2 and 3 atm. abs. When the point in the conversion has been reached at which the polymer particles no longer coalesce, the pressure is increased to at least 1.2 atm. abs. when the pressure at the beginning of the polymerization was 1 atm. abs., or to 3.6 atm. abs. if the initial pressure was 3 atm. abs. As is further shown in the examples at polymerization temperatures of about 65 to 90° C. original pressures of about 2 to 5 atm. absolute are preferred which are then increased to pressures of about 3 to about 13 atm. absolute by forcing in an inert gas.

In some cases it is advantageous to evacuate the reactor prior to the polymerization.

The rate at which the inert gas is forced in may be such that the required amount is introduced within a few minutes. It is also possible with equal success to increase the pressure in the reactor to the desired value within a few hours, for example one to three hours.

It is not necessary to ascertain the point at which the suspended particles no longer coalesce in a separate experiment. Sometimes it is simpler in a number of experiments to increase the pressure in the reactor after various periods of conversion and to ascertain after which period of conversion polymer particles are obtained which are free from pockmarks and gas inclusion.

By inert gases we mean substances which are normally gaseous (i.e. at atmospheric pressure and 20° C.) and which do not affect the polymerization of the monomers. Examples of such substances are methane, ethane, nitrogen, carbon dioxide and rare gases. Sometimes it is possible to use air, although atmospheric oxygen affects the course of the polymerization.

The invention is further illustrated by the following examples in which parts are by weight. The K-values given are determined by the method of H. Fikentscher (Cellulose Chemie 13, (1932) 60).

EXAMPLE 1

200 parts of water, 100 parts of styrene, 0.3 part of a copolymer of 95 parts of N-vinylpyrrolidone and 5 parts of methyl acrylate having a K-value of 72, 0.2 part of sodium pyrophosphate and 0.45 part of benzoyl peroxide are heated in a vessel to 70° C. while stirring. Eleven hours later, the pressure in the vessel is increased to 9 atm. abs. within an hour by forcing in nitrogen. Conversion at this point is about 80%. Polymerization is then continued for another ten hours at 70° C. and another fifteen hours at 85° C. Spherical beads having a smooth surface are obtained. If the increase in pressure is effected after eight hours or fourteen hours (instead of eleven hours) pockmarked beads are obtained.

EXAMPLE 2

200 parts of water, 100 parts of styrene, 7 parts of pentane, 0.3 part of a copolymer of 95 parts of N-vinylpyrrolidone and 5 parts of methyl acrylate having a K-value of 82, 0.2 part of sodium pyrophosphate and 0.45 part of benzoyl peroxide are heated to 70° C. in an agitated vessel, a pressure of 2.4 atm. abs. being set up. Sixteen hours later, the pressure is increased uniformly to 11 atm. abs. within one hour by forcing in methane. Polymerization is then continued for another eight hours at 70° C. and then for another fifteen hours at 85° C. Spherical, pockmark-free beads are obtained which are free from monomer constituents and can be processed by known methods in gas permeable molds to form molded articles which have a particularly smooth surface and are free from inclusions. If the increase in pressure is effected, not after sixteen hours, but after twelve hours or after twenty-two hours, beads having a pockmarked surface are obtained. Expanded molded articles prepared from these beads contain blisters.

EXAMPLE 3

200 parts of water, 80 parts of styrene, 20 parts of acrylonitrile, 7.2 parts of pentane, 0.3 part of poly-N-vinylpyrrolidone having a K-value of 90, 1.3 parts of butyl stearate and 0.4 part of benzoyl peroxide are kept at 65° C. under nitrogen at a pressure of 4.5 atm. abs. in an agitated vessel. Sixteen hours later, the pressure in the reactor is increased to 7 atm. abs. within five minutes by forcing in nitrogen. Polymerization is then continued for another two hours at 65° C. and another sixteen hours at 80° C. Spherical blister-free beads are obtained which can be processed into molded articles having a smooth surface.

EXAMPLE 4

200 parts of water, 100 parts of styrene, 65 parts of pentane, 0.3 part of a copolymer of 95 parts of N-vinylpyrrolidone and 5 parts of methyl acrylate, 0.2 part of sodium pyrophosphate, 0.42 part of benzoyl peroxide and 3 parts of hexabromocyclododecane are kept at 70°

C. in an agitated vessel. An internal pressure of 2.6 atm. abs. is thereby set up. Eighteen hours later, the pressure is increased within thirty minutes to 12 atm. abs. by forcing in nitrogen. Polymerization is then continued for two hours at 70° C. and another fifteen hours at 85° C. Blister-free beads are obtained which can be processed into self-extinguishing molded articles having a smooth surface.

By working in the absence of pentane and following the same procedure, pockmark-free beads are obtained which can be used as injection molding material.

EXAMPLE 5

200 parts of water, 100 parts of styrene, 0.3 part of a copolymer of 95 parts of N-vinylpyrrolidone and 5 parts of methyl acrylate, 0.2 part of sodium pyrophosphate, 0.45 part of benzoyl peroxide are introduced into a pressure-tight agitated vessel. The vessel is closed and evacuated (to 16 mm. Hg) with a water jet pump. Then 7 parts of pentane is allowed to flow into the vessel which is then heated with stirring to 70° C. Nineteen and one-half hours later, the pressure is increased within twenty minutes to 6 atm. abs. by forcing in nitrogen. Polymerization is then continued for three hours at 70° C. and for another twelve hours at 85° C.

Blister-free beads are formed which can be procesesd into expanded plastics which have a smooth surface and are free from inclusions.

EXAMPLE 6

100 parts of water, 70 parts of styrene, 30 parts of 2,5-dichlorostyrene, 0.4 part of lauroyl peroxide, 0.3 part of tertiary-butyl perbenzoate, 6.8 parts of hexane and 0.5 part of carboxymethylcellulose having a K-value of 60 are heated to 65° C. in a closed agitated vessel. An internal pressure of 3.2 atm. abs. is set up. The total polymerization period is fifteen hours at 65° C. and five hours at 90° C. After a polymerization period of fourteen hours at 65° C. (reckoned from the beginning of polymerization, i.e., from the attainment of 65° C.), the internal pressure is increased from 3.2 to 4.0 atm. abs. by forcing in argon. Blister-free beads are obtained.

4.2 parts of propane may be used as expanding agent instead of 6.8 parts of hexane in the same way. In this case the pressure in the vessel is increased from an initial pressure of 4.6 atm. abs. to 6.0 atm. abs.

EXAMPLE 7

100 parts of water, 95 parts of styrene, 5 parts of methyl methacrylate, 5.8 parts of hexane, 1.5 parts of dichlorodifluoromethane, 0.6 part of tertiary-butyl perbenzoate and 1.0 part of freshly precipitated barium sulfate are heated to 90° C. in an agitated vessel, an internal pressure of 4.5 atm. abs. thus being set up. Polymerization is continued for a total of ten hours at 90° C. and five hours at 100° C. After a polymerization period of eight hours (reckoned from the beginning of the polymerization, i.e., from the attainment of 90° C.) the internal pressure is increased from 4.5 atm. abs. to 6.0 atm. abs. by forcing in nitrogen. Blister-free beads are obtained.

EXAMPLE 8

100 parts of water, 100 parts of styrene, 0.4 part of azodiisobutyronitrile, 6.5 parts of pentane and 0.2 part of a copolymer of 90 parts of N-vinylpyrrolidone and 10 parts of methyl acrylate are heated to 70° C. in an agitated vessel, an internal pressure of 2.2 atm. abs. thus being set up. The total polymerization period is twenty hours at 70° C. and ten hours at 90° C. After a polymerization period of eighteen hours at 70° C. (reckoned from the beginning of the polymerization, i.e., from the attainment of 70° C.), the internal pressure is increased from 2.2 atm. abs. to 3.6 atm. abs. by forcing in nitrogen with which 5% carbon dioxide has been mixed. Blister-free beads are obtained.

EXAMPLE 9

200 parts of water, 100 parts of styrene, 0.6 part of benzoyl peroxide, 6.0 parts of pentane and 0.06 part of the sodium salt of a 1:1 copolymer of styrene and maleic anhydride are heated to 70° C. in an agitated vessel while stirring, an internal pressure of 2.0 atm. abs. being set up. The total polymerization period is twenty hours at 70° C. and fifteen hours at 85° C. After a polymerization period of sixteen hours, the internal pressure is raised from 2.0 atm abs. to 5.0 atm. abs. by forcing in nitrogen. Blister-free beads are obtained.

We claim:

1. A process for the production of suspension polymers by the polymerization of styrene in aqueous suspension using a free radical forming polymerization catalyst in the presence of a suspension stablizer at temperatures between 50 and 120° C., which comprises increasing the pressure in the polymerization vessel by at least one fifth of the original pressure by forcing an inert gas, which is a normally gaseous substance at atmospheric pressure and 20° C. and which does not affect the polymerization of the styrene, into the polymerization vessel when the conversion of styrene to polymer has reached the particle identity point, and thereafter completing the polymerization.

2. A process for the production of suspension polymers by the polymerization of monomer mixtures containing at least 50% by weight of styrene and up to 50% by weight of other ethylenically unsaturated monomeric polymerizable compounds in aqueous suspension using a free radical forming polymerization catalyst in the presence of a suspension stabilizer at a temperature between 50 and 120° C., which comprises increasing the pressure in the polymerization vessel by at least one fifth of the original pressure by forcing an inert gas, which is a normally gaseous substance at atmospheric pressure and 20° C. and which does not affect the polymerization of the monomer mixture, into the polymerization vessel when the conversion of the monomer mixture to polymer has reached the particle identity point, and thereafter completing the polymerization.

3. A process as claimed in claim 1 wherein the styrene is polymerized in the presence of 3 to 15% by weight, based on the monomeric styrene, of an expanding agent selected from the group consisting of liquid aliphatic hydrocarbons and halohydrocarbons and gaseous aliphatic hydrocarbons and halohydrocarbons liquefiable under the reaction pressure which do not dissolve polystyrene and whose boiling point is below the softening point of the polystyrene.

4. A process as claimed in claim 2 wherein the polymerization of said mixtures of styrene and other ethylenically unsaturated monomeric polymerizable compounds is carried out in the presence of 3 to 15% by weight, based on the mixture, of an expanding agent selected from the group consisting of liquid aliphatic hydrocarbons and halohydrocarbons and gaseous aliphatic hydrocarbons and halohydrocarbons liquefiable under the reaction pressure which do not dissolve the resultant polymer and whose boiling point is below the softening point of the polymer.

5. A process as claimed in claim 1 wherein the suspension stabilizer is a water-soluble high molecular weight compound.

6. A process as claimed in claim 2 wherein the suspension stabilizer is a water-soluble high molecular weight compound.

7. A process as claimed in claim 1 wherein the suspension stabilizer is a copolymer of N-vinylpyrrolidone and a member selected from the group consisting of acrylic esters of alcohols containing one to eight carbon atoms and vinyl esters of carboxylic acids containing one to eight carbon atoms.

8. A process as claimed in claim 2 wherein the suspension stabilizer is a copolymer of N-vinylpyrrolidone and a member selected from the group consisting of acrylic esters of alcohols containing one to eight carbon atoms and vinyl esters of carboxylic acids containing one to eight carbon atoms.

9. A process as claimed in claim 1 wherein the inert gas is a member of the group consisting of methane, ethane, nitrogen, carbon dioxide and a rare gas.

10. A process as claimed in claim 2 wherein the inert gas is a member of the group consisting of methane, ethane, nitrogen, carbon dioxide and a rare gas.

References Cited

UNITED STATES PATENTS

| 2,888,410 | 5/1959 | Buchholtz | 260—2.5 |
| 3,192,169 | 6/1965 | Doak | 260—2.5 |

MURRAY TILLMAN, *Primary Examiner.*

M. FOELAK, *Assistant Examiner.*

UNITED STATES PATENT OFFICE
CERTIFICATE OF CORRECTION

Patent No. 3,324,052                                         June 6, 1967

Ludwig Zuern et al.

It is hereby certified that error appears in the above numbered patent requiring correction and that the said Letters Patent should read as corrected below.

Column 1, line 29, for "do run" read -- do not run --; line 45, for "insert" read -- inert --.

Signed and sealed this 26th day of November 1968.

(SEAL)
Attest:

Edward M. Fletcher, Jr.                                     EDWARD J. BRENNER
Attesting Officer                                            Commissioner of Patents